(12) United States Patent
Somervill et al.

(10) Patent No.: US 7,136,957 B2
(45) Date of Patent: Nov. 14, 2006

(54) DEVICE BANDWIDTH MANAGEMENT USING A BUS CONFIGURATION MULTIPLEXER

(75) Inventors: Kevin M. Somervill, Newport News, VA (US); Robert W. Dobbs, Granite Bay, CA (US); Loren Koehler, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 285 days.

(21) Appl. No.: 10/808,881

(22) Filed: Mar. 24, 2004

(65) Prior Publication Data

US 2005/0216647 A1    Sep. 29, 2005

(51) Int. Cl.
*G06F 13/00* (2006.01)
*G06F 13/36* (2006.01)
*G06F 1/26* (2006.01)

(52) U.S. Cl. .................. 710/316; 710/104; 710/302

(58) Field of Classification Search .............. 710/316, 710/302–304, 104, 72, 305, 107, 307, 317, 710/37; 713/1, 323; 370/464, 362, 364, 370/357, 916; 712/29; 709/253; 716/12
See application file for complete search history.

(56) References Cited

U.S. PATENT DOCUMENTS

| | | | | |
|---|---|---|---|---|
| 4,777,613 A | * | 10/1988 | Shahan et al. | 708/510 |
| 5,867,733 A | * | 2/1999 | Meyer | 710/74 |
| 5,911,149 A | * | 6/1999 | Luan et al. | 711/147 |
| 5,918,027 A | * | 6/1999 | Osakabe | 710/305 |
| 6,101,565 A | * | 8/2000 | Nishtala et al. | 710/307 |
| 2003/0210707 A1 | * | 11/2003 | Pickett | 370/466 |
| 2004/0139259 A1 | * | 7/2004 | Mantey et al. | 710/113 |
| 2005/0060593 A1 | * | 3/2005 | Chen et al. | 713/322 |

OTHER PUBLICATIONS

"Reduced switching delay in wavelength division multiplexed two-dimensional multiple-plane optical interconnections using multiple-wavelength VCSEL arrays" by Leight et al. (abstract only) Publication Date: Jun. 1996.*

* cited by examiner

*Primary Examiner*—Gopal C. Ray

(57) ABSTRACT

One embodiment of the invention includes a system for changing a bus configuration of a computing device. The system includes a first bus of the computing device, a second bus, and a third bus. Additionally, a multiplexing module is coupled with the first, second, and third buses. As such, the multiplexing module can selectively couple the first bus with the second bus or the third bus. A configuration module is coupled with the multiplexing module and controls its operation.

21 Claims, 4 Drawing Sheets

DEVICE BANDWIDTH MANAGEMENT USING A BUS CONFIGURATION MULTIPLEXER

BACKGROUND

Some computer systems currently include one or more input/output (I/O) slots, each for receiving an add-in I/O card, which can also be referred to as an interface card. Typically, each of these I/O card slots is connected to a controller adapter chip by an industry standard bus for peripheral add-in cards. The adapter chip controls this add-in card's bus. Each adapter chip is usually connected to the rest of its associated computer system with an internal I/O mid-bus thereby enabling an add-in I/O card connected to its corresponding I/O slot to access the computer system's CPU (central processor unit) and memory, and vice versa.

However, there are disadvantages associated with this type of configuration for a computer system. For example, one of the disadvantages is that once the computer system's I/O configuration has been physically implemented, there is usually not much flexibility with that configuration. For example, an I/O configuration may be physically implemented with several add-in card slots that support a particular communication bandwidth. However, when a new and improved interface card is introduced to the market that utilizes a communication bandwidth greater than that supported by any of the add-in card slots of the I/O configuration, the computer system is unable to utilize the new interface card. As such, the computer user typically either has to live with the limitations of their computer system or buy a more current computer system with the desired features.

SUMMARY OF THE INVENTION

One embodiment of the invention includes a system for changing a bus configuration of a computing device. The system includes a first bus of the computing device, a second bus, and a third bus. Additionally, a multiplexing module is coupled with the first, second, and third buses. As such, the multiplexing module can selectively couple the first bus with the second bus or the third bus. A configuration module is coupled with the multiplexing module and controls its operation.

DETAILED DESCRIPTION

Reference will now be made in detail to embodiments of the invention, examples of which are illustrated in the accompanying drawings. While the invention will be described in conjunction with embodiments, it is noted that they are not intended to limit the invention to these embodiments. On the contrary, the invention is intended to cover alternatives, modifications and equivalents, which may be included within the scope of the invention as defined by the appended claims. Furthermore, in the following detailed description of the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail so as not to unnecessarily obscure aspects of the invention.

Figure 1:
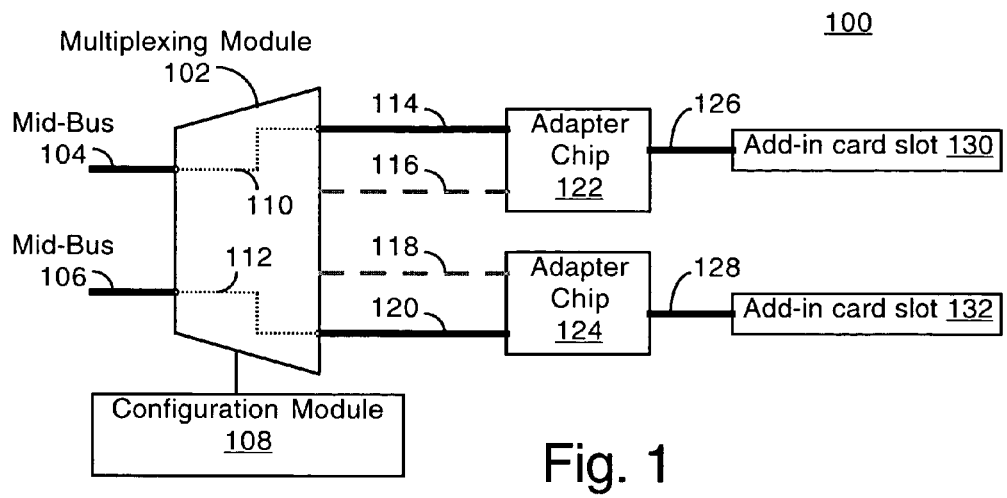
FIG. 1 is a block diagram of a bus configuration multiplexer system in accordance with embodiments of the invention.

FIG. 1 is a block diagram of a bus configuration multiplexer system 100 in accordance with embodiments of the invention. The bus configuration multiplexer system 100 is able to provide two or more operating bus configurations for an input/output (I/O) system (or subsystem) of a computing device (e.g., 800 of FIG. 8). In this manner, the bus configuration multiplexer system 100 is able to provide a higher bandwidth in the I/O subsystem and also increase the configurability of its slots. It is noted that the configurations of the bus configuration multiplexer system 100 can be changed dynamically and/or manually.

The bus configuration multiplexer system 100 includes I/O mid-buses 104 and 106 which are each coupled with a bus multiplexing module 102. Additionally, the multiplexing module 102 is coupled with a controller adapter chip 122 via I/O mid-buses 114 and 116. Also, the multiplexing module 102 is coupled with a controller adapter chip 124 via I/O mid-buses 118 and 120. It is noted that mid-buses 116 and 118 are each represented by gray dashed lines to indicate that they are currently inactive. A configuration module 108 is coupled with the multiplexing module 102 that is capable of controlling the routing configuration functionality of the multiplexing module 102.

Within the multiplexing module 102 of FIG. 1, configuration routing 110 currently couples mid-bus 104 with mid-bus 114 while configuration routing 112 currently couples mid-bus 106 with mid-bus 120. In this manner, adapter chip 122 is coupled to utilizes mid-bus 104 while adapter chip 124 is coupled to utilizes mid-bus 106. Within bus configuration multiplexer system 100, controller adapter chip 122 is coupled with add-in I/O card slot 130 by card bus 126 while controller adapter chip 124 is coupled with add-in I/O card slot 132 by card bus 128. As such, add-in I/O card slot 130 is currently coupled with mid-bus 104 while add-in I/O card slot 132 is coupled with mid-bus 106. In this manner, an interface card coupled with add-in I/O card slot 130 can communicate with other computer system components (not shown) via mid-bus 104 while another interface card coupled with add-in I/O card slot 132 can communicate with other computer system components via mid-bus 106.

It is noted that multiplexing module 102 (or multiplexer module) is not strictly limited to the couplings shown. For example, multiplexing module 102 may be coupled with and handle a greater or fewer number of mid-buses similar to mid-buses 104 and 106. Additionally, the multiplexing module 102 may be coupled with a greater or fewer number of mid-buses similar to mid-buses 114–120. It is appreciated that each of adapter chips 122 and 124 can be coupled with a greater or fewer number of mid-buses similar to mid-buses 114–120.

Figure 2:
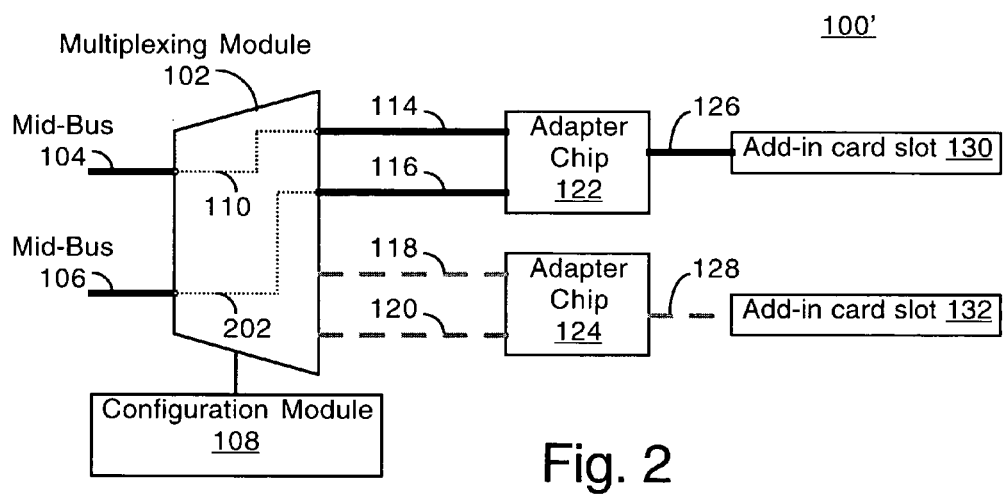
FIG. 2 is a block diagram of a modified bus configuration multiplexer system in accordance with embodiments of the invention.

Within FIG. 1, it is noted that the configuration module 108 can control the multiplexing module 102 to couple mid-bus 104 with either mid-bus 114, 116, 118, or 120. Alternatively, the configuration module 108 can control the multiplexing module 102 to couple mid-bus 106 with either mid-bus 114, 116, 118, or 120. For example, FIG. 2 illustrates the configuration module 108 controlling the multiplexing module 102 such that mid-bus 106 is redirected and routed to couple with mid-bus 116. In this manner, mid-buses 104 and 106 are able to service add-in card slot 130. It is noted that card bus 126 can be implemented to handle a communication bandwidth equal to or greater than the combined communication bandwidth of the mid-buses 104 and 106. Moreover, card bus 128 can be implemented to handle a communication bandwidth equal to or greater than the combined communication bandwidth of the mid-buses 104 and 106.

Specifically, FIG. 2 is a block diagram of a bus configuration multiplexer system 100' in accordance with embodiments of the invention. The configuration module 108 causes (or initiates) a configuration routing 202 of the multiplexing module 102 which couples the mid-bus 106 with the mid-bus 116. As part of activating the routing configuration 202 of the multiplexing module 102, the routing configuration 112 is deactivated and as such is not shown in FIG. 2. After the bus configuration change, mid-buses 104 and 106 are both coupled with the add-in card slot 130 thereby allowing for that slot to have an increased bandwidth equivalent to the combined bandwidth of both mid-buses 104 and 106. Therefore, the add-in card slot 130 is capable of handling an I/O add-in card (or interface card) that utilizes a larger bandwidth. It is noted that within this configuration, adapter chip 124 and add-in card slot 132 are essentially "off-line." The mid-buses 118, 120 and 128 are represented as gray dashed lines to indicate that they are currently inactive.

There are different practical applications for the configuration module 108 to change the configuration routing of the multiplexing module 102 associated with mid-bus 104 and 106. For example, a brand new interface card may be plugged into the add-in card slot 130 that involves an increased bandwidth. As such, the ability to configure the bus configuration multiplexer system 100' as shown in FIG. 2 can add value to a customer's computing device (e.g., 800 of FIG. 8) so that over time it can handle new add-in cards that become available which involve higher (or increased) bandwidths. It is understood that this added value can also be provided by configuring the bus configuration multiplexer system 100" as shown in FIG. 3.

Another practical application example may involve having the add-in slot 130 of FIGS. 1 and 2 coupled with a backup network (not shown) so that data of its computer system or computing device can be backed-up once a day for some time period (e.g., a half hour) which involves increased communication bandwidth. As such, given an original operating configuration of mid-buses 104 and 106 as shown in FIG. 1, prior to an appointed backup time, a software program (for example) can cause the configuration module 108 to reconfigure the multiplexing module 102 such that mid-bus 106 is coupled with mid-bus 116 via configuration routing 202 as shown in FIG. 2. The backup process could then take place for the allotted or desired time period. Once completed, the software program (for example) can then cause the configuration module 108 to reconfigure the multiplexing module 102 such that mid-bus 106 is coupled with mid-bus 120 via configuration routing 112 as shown in FIG. 1.

Yet another practical application example may involve having the add-in card slot 132 of FIG. 2 coupled with a secure network (not shown). It may be undesirable to have the computer system (or computing device) associated with add-in slot 132 coupled with the secure network all the time. Additionally, it may be desirable to have the add-in slot 132 coupled with the secure network at certain time periods when its computer system is authorized to use the secure network. As such, the normal operating configuration of the bus configuration multiplexer system 100' may be that shown in FIG. 2. However, at an appointed or desired time, a software program (for example) can cause the configuration module 108 to reconfigure the multiplexing module 102 (as shown in FIG. 3) such that mid-bus 104 is coupled with mid-bus 118 via a configuration routing 302 and mid-bus 106 is coupled with mid-bus 120 via configuration routing 112. As part of activating the routing configurations 302 and 112 of the multiplexing module 102, the routing configuration 110 and 202 are deactivated and as such are not shown in FIG. 3. After utilization of the secure network has been completed, the software program (for example) can then cause the configuration module 108 to reconfigure the multiplexing module 102 as shown in FIG. 2 such that mid-bus 104 is coupled with mid-bus 114 via configuration routing 110 and mid-bus 106 is coupled with mid-bus 116 via configuration routing 202. As part of activating the routing configurations 110 and 202 of the multiplexing module 102, the routing configurations 112 and 302 are deactivated and as such are not shown in FIG. 2.

Figure 3:
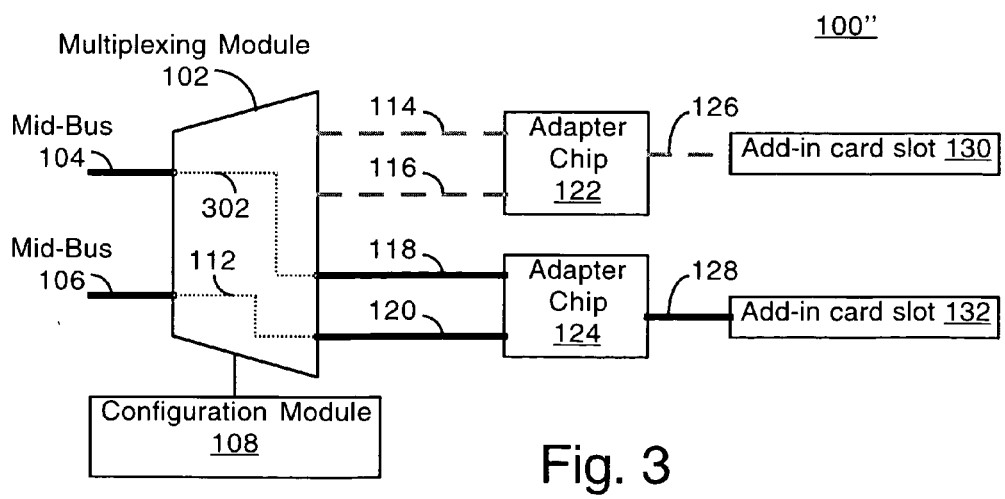
FIG. 3 is a block diagram of another modified bus configuration multiplexer system in accordance with embodiments of the invention.

Within FIGS. 1–3, it is understood that the configuration module 108 may be implemented to control the multiplexing module 102 in a dynamic or fixed fashion. For example, in the fixed fashion, the configuration module 108 may be implemented with one or more hardware switches that can be manually set into a "fixed" (or non-dynamic) configuration. As such, when the computer system associated with configuration module 108 boots or starts up, its operating system may determine (e.g., by polling) the configuration of mid-buses 104 and 106 which stays constant while the computer system is active. This situation may be desirable in the case where a supplier of computer systems has multiple markets, but it only wants to supply one motherboard (for example) that satisfies multiple configurations. Within this example, one or more switches of the configuration module 108 can be set before shipping and subsequently may be adjusted (if desired). If one or more switches of the configuration module 108 are to be adjusted, the whole computer system may be taken off-line or shutdown and a service technician (for example) can then flip (or change) one or more of the switches. Related to this type of "fixed" system, a customer could pay for an upgrade to their computer system and a service technician could flip (or change) one or more switches of the configuration module 108 thereby providing additional functionality to that customer's computer system.

Alternatively, the configuration module 108 may be implemented to control the multiplexing module 102 in a dynamic (or on-the-fly) fashion. For example, in the dynamic fashion, the configuration module 108 may be implemented with one or more registers that can be controlled by software operating on the computer system (or computing device). Specifically, the operating system (or some other software) running on the computer system can call a lower level subroutine (e.g., using one or more side-band signals) that may be implemented in firmware that understands how to control the hardware of the configuration module 108. Additionally, the software can keep track of how the resources have been changed with respect to the I/O structure (for example) add-in card slot 130 is on-line while add-in card slot 132 is off-line as shown in FIG. 2.

There are a wide variety of ways for software to dynamically change or modify the configuration of the multiplexing module 102 via the configuration module 108. For example, given the bus configuration multiplexer system 100 is currently configured as shown in FIG. 1, the first thing that may be done is to put any add-in cards resident to card slots 130 and 132 into a sleep state or an off-line state so that data is not corrupted or interrupted and also take both controller adapter chips 122 and 124 off-line. Next, software may then transmit one or more signals to address one or more registers of the configuration module 108 in order to change (or alter) the configuration routing of the multiplexing module 102 (e.g., as shown in FIG. 2 or 3). Once the switch is completed, the I/O subsystem may be reset in order to bring the controller adapter chip 122 back on-line as shown in FIG. 2 or 3.

One of the benefits of the bus configuration multiplexer system 100 (FIG. 1) is that it has functionality that can be implemented if one or more of its components fails such as a bus, an adapter chip, an add-in card slot, and/or an interface card coupled with one of the card slots. For example, if the controller adapter chip 124 of the bus configuration multiplexer system 100 becomes inoperative (or fails), the configuration module 108 can cause (or initiate) the configuration routing 202 of the multiplexing module 102 to couple the mid-bus 106 with the mid-bus 116 as shown in FIG. 2. In this manner, the configuration module 108 is able to reconfigure (or reassign) mid-bus 106 to be coupled with the active adapter chip 122 where its available bandwidth can be utilized instead of being wasted while coupled with the inoperative adapter chip 124.

Within another example, if the mid-bus 106 of the bus configuration multiplexer system 100 of FIG. 1 failed or became inoperative, the configuration module 108 can separately utilize configuration routings 110 and 302 (FIG. 3) of the multiplexing module 102 so that adapter chips 122 and 124 can both remain active. For instance, maybe the adapter chip 124 and add-in card slot 132 were just utilized once a day in order to backup data of their associated computer system. As such, software (for example) utilizing configuration module 108 and multiplexing module 102 can switch the active mid-bus 104 from being coupled with adapter chip 122 (FIG. 1) to being coupled with adapter chip 124 (FIG. 3) via routing 302 during the backup process. As part of activating the routing configuration 302 of the multiplexing module 102, the routing configuration 110 is deactivated and as such is not shown in FIG. 3. Once the backup process is completed, the software utilizing configuration module 108 and multiplexing module 102 can then switch the active mid-bus 104 back to being coupled to adapter chip 122 (as shown in FIG. 1) via routing 110 where it can remain until the next scheduled backup process. As part of activating the routing configuration 110 of the multiplexing module 102, the routing configuration 302 is deactivated and as such is not shown in FIG. 1. It is noted that the previous examples described above illustrate how the functionality of being able to reconfigure the routing of mid-buses 104 and/or 106 may be utilized when one or more components of the bus configuration multiplexer system 100 fail or become inoperative.

With reference to FIGS. 1–3, the configuration module 108 and the multiplexing module 102 are well suited to operate with any type (or size) of buses in any manner similar to that described herein with reference to mid-buses. For example, the multiplexing module 102 and configuration module 108 can be implemented to operate with, but not limited to, memory buses, side-band buses, and the like. In this manner, the multiplexing module 102 and configuration module 108 may provide a computing device (or computer system) one or more of the functions and/or benefits described herein with reference to mid-buses. The configuration module 108 and the multiplexing module 102 can be implemented as separate modules as shown or incorporated together as a single module (not shown). The configuration module 108 may be located at a wide variety of locations throughout a computing device. It is noted that the multiplexing module 102 can be implemented in a wide variety of ways. For example, the multiplexing module 102 can be implemented with, but not limited to, electrical circuitry.

Figure 4:
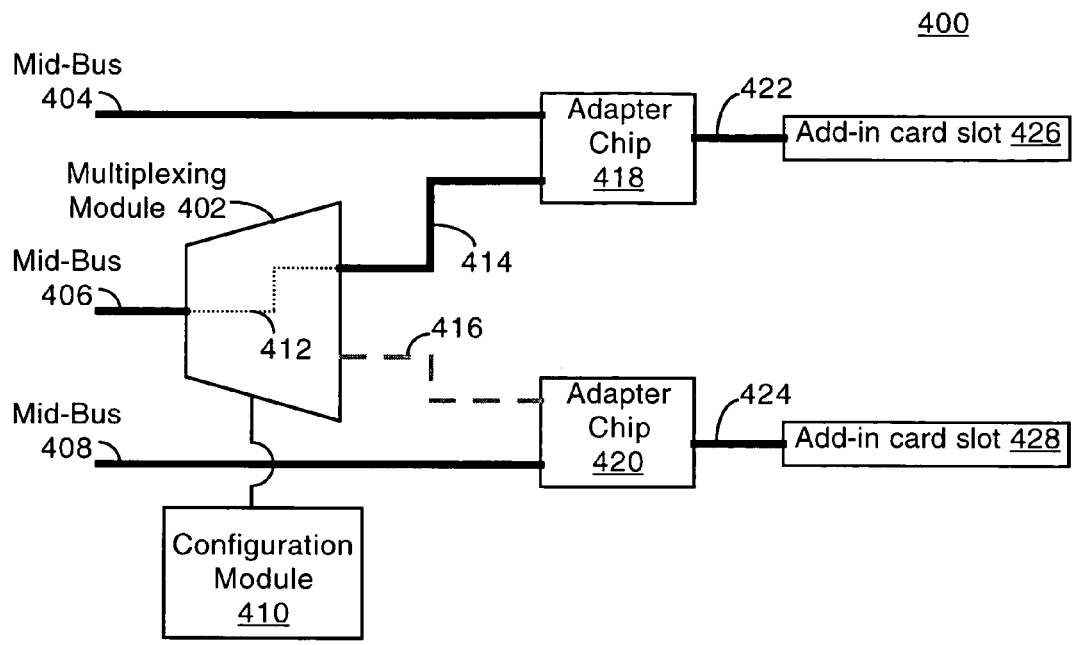
FIG. 4 is a block diagram of another bus configuration multiplexer system in accordance with embodiments of the invention.

FIG. 4 is a block diagram of a bus configuration multiplexer system 400 in accordance with embodiments of the invention. The bus configuration multiplexer system 400 is able to provide two or more operating bus configurations for an I/O system (or subsystem) of a computing device (e.g., 800 of FIG. 8). In this manner, the bus configuration multiplexer system 400 is able to provide a higher bandwidth in the I/O subsystem and also increase the configurability of its slots. It is noted that the configurations of the bus configuration multiplexer system 400 can be changed dynamically and/or manually.

The bus configuration multiplexer system 400 includes an I/O mid-bus 406 that can be coupled with controller adapter chip 418 or 420 and effectively to add-in card slots 426 or 428. As such, additional communication bandwidth can be provided to either controller adapter chip 418 and add-in card slot 426 or controller adapter chip 420 and add-in card slot 428. Furthermore, if an I/O mid-bus (e.g., 404 or 408) coupled with a controller adapter chip (e.g., 418 or 420) fails or becomes inoperative, the mid-bus 406 can be utilized to replace the inoperative mid-bus by being coupled to its associated controller adapter chip.

Specifically, within FIG. 4 the mid-bus 406 is coupled with a bus multiplexing module 402 which is coupled with mid-buses 414 and 416. Additionally, mid-bus 414 is coupled with controller adapter chip 418 while mid-bus 416 is coupled with controller adapter chip 420. As such, a configuration module 410 can cause the multiplexing module 402 to activate a configuration routing 412 thereby coupling mid-bus 406 with mid-bus 414. In this manner, adapter chip 418 is coupled with mid-bus 406. Therefore, the mid-bus 414 is activated while mid-bus 416 is currently inactive which is represented by gray dashed lines. Within this configuration, the controller adapter 418 effectively has the combined communication bandwidth of mid-buses 404 and 406 which service add-in card slot 426. It is appreciated that the controller adapter chip 420 remains active since it is coupled with mid-bus 408. In this manner, an interface card (or add-in card) coupled with add-in I/O card slot 426 can communicate with other computer system components (not shown) via mid-buses 404 and 406 while an interface card (or add-in card) coupled with add-in I/O card slot 428 can communicate with other computer system components via mid-bus 408.

Figure 5:
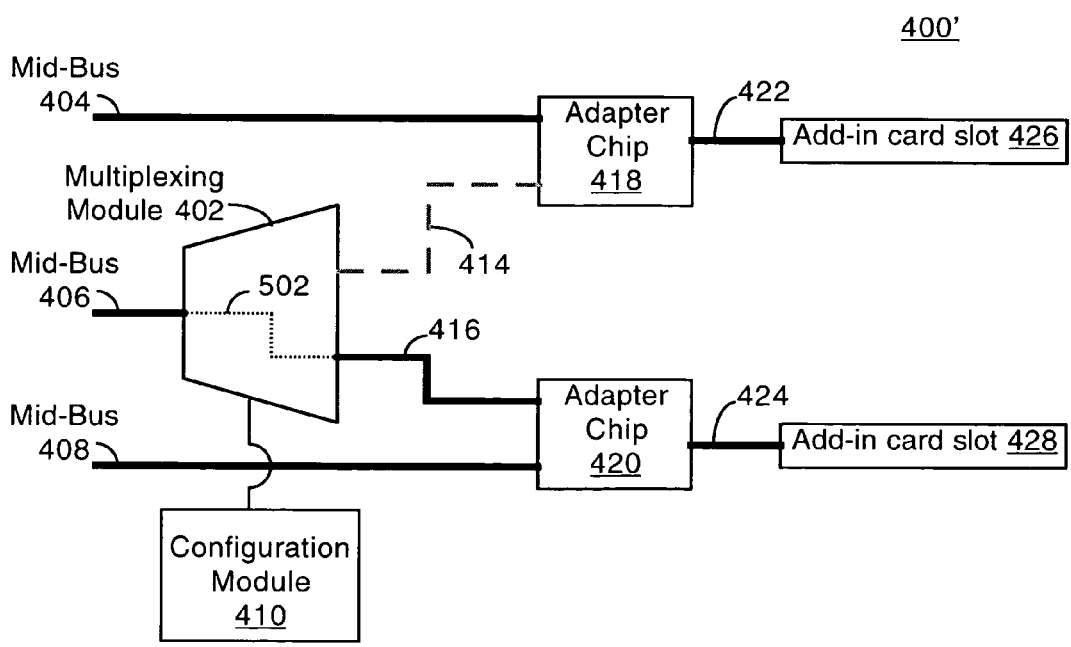
FIG. 5 is a block diagram of a reconfigured bus configuration multiplexer system in accordance with embodiments of the invention.

Conversely, as shown in FIG. 5, the configuration module 410 can cause the multiplexing module 402 (or multiplexer module) to activate a configuration routing 502 thereby coupling mid-bus 406 with mid-bus 416. In this manner, adapter chip 420 is coupled with mid-bus 406. Consequently, the mid-bus 416 becomes activated while mid-bus 414 becomes inactive which is represented by gray dashed lines. Within this configuration, the controller adapter 420 effectively has the combined communication bandwidth of mid-buses 406 and 408 which service the add-in card slot 428. It is understood that the controller adapter chip 418 remains active since it is coupled with the mid-bus 404. In this manner, an interface card (or add-in card) coupled with add-in I/O card slot 428 can communicate with other computer system components (not shown) via mid-buses 406 and 408 while an interface card (or add-in card) coupled with add-in I/O card slot 426 can communicate with other computer system components via mid-bus 404.

Within FIG. 4, the mid-bus 404 is coupled with controller adapter chip 418 which is coupled with add-in I/O card slot 426 by card bus 422. It is noted that card bus 422 can be implemented to handle a communication bandwidth equal to or greater than the combined communication bandwidth of the mid-buses 404 and 406. The mid-bus 408 is coupled with controller adapter chip 420 which is coupled with add-in I/O card slot 428 by card bus 424. The card bus 424 can be implemented to handle a communication bandwidth equal to or greater than the combined communication bandwidth of the mid-buses 406 and 408. The mid-bus 406 is coupled with multiplexing module 402. Additionally, the multiplexing module 402 is coupled with controller adapter chip 418 via mid-bus 414. Also, the multiplexing module 402 is coupled with controller adapter chip 420 via mid-bus 416. The configuration module 410 is coupled with the multiplexing module 402 and is capable of controlling the routing configuration functionality of the multiplexing module 402.

FIG. 5 is a block diagram of a bus configuration multiplexer system 400' in accordance with embodiments of the invention. As previously mentioned, configuration module 410 causes the routing configuration 502 of the multiplexing module 402 to couple the mid-bus 406 with the mid-bus 416. Therefore, mid-buses 406 and 408 are both coupled with the add-in card slot 428 thereby allowing that slot to have an increased bandwidth equivalent to the combined bandwidth of both mid-buses 406 and 408. Therefore, the add-in card slot 428 is capable of handling an I/O add-in card (or interface card) that utilizes a larger bandwidth.

It is noted that as part of activating routing configuration 502 of the multiplexing module 402, the routing configuration 412 is deactivated and as such is not shown in FIG. 5. With routing configuration 412 deactivated within multiplexing module 402, the mid-bus 414 is rendered inactive (or off-line) as represented by its gray dashed lines. Therefore, the communication bandwidth of the controller adapter chip 418 and the add-in card slot 426 to other computer system components are limited to the bandwidth of mid-bus 404.

Within FIGS. 4 and 5, there are a variety of practical applications for the configuration module 410 to change the configuration routing of the multiplexing module 402 associated with mid-bus 406. For example, a new interface card (or add-in card) may be plugged into the add-in card slot 428 that has an increased bandwidth. As such, the ability to configure the bus configuration multiplexer system 400' as shown in FIG. 5 can add value to a customer so that over time the computer system (e.g., 800 of FIG. 8) can handle new add-in cards that become available which involve increased (or higher) bandwidths.

Yet another practical application example may involve having an interface card coupled with the add-in slot 428 of FIGS. 4 and 5 coupled with a backup network (not shown) so that data of its computer system (e.g., 800 of FIG. 8) can be backed-up once a day for some time period (e.g., 15 minutes) which involves increased communication bandwidth. Therefore, with an original operating configuration of buses 404, 406 and 408 as shown in FIG. 4, prior to the backup process, a software program (for example) can cause the configuration module 410 to reconfigure the multiplexing module 402 as shown in FIG. 5 such that mid-bus 406 is coupled with mid-bus 416 via configuration routing 502. The backup process may then take place via the interface card coupled with the card slot 428 for an allotted time period. Once the backup is completed, the software program (for example) can then cause the configuration module 410 to reconfigure the multiplexing module 402 as shown in FIG. 4 such that mid-bus 406 is coupled with mid-bus 414 via configuration routing 412. In this manner, the interface card coupled with add-in card slot 426 is able to utilize the communication bandwidth of mid-buses 404 and 406 for the time period not involved with the backup process.

Within FIGS. 4 and 5, it is understood that the configuration module 410 can be implemented to control the multiplexing module 402 in a dynamic or fixed manner. For example, in the fixed manner, the configuration module 410 may be implemented with one or more hardware switches that can be manually set into a "fixed" (or non-dynamic) configuration. Therefore, when the computer system or computing device associated with configuration module 410 is started up (or boots), its operating system may determine (e.g., by polling) the configuration of buses 404, 406 and 408 which stays constant while the computer system is active. This condition may be desirable in the case where a computer system supplier has multiple markets, but it only wants to supply one motherboard (for example) that satisfies multiple configurations. Within this example, one or more switches of the configuration module 410 can be set before shipping and later may be adjusted (if desired). If one or more switches of the configuration module 410 are to be adjusted, the whole computer system may be taken off-line (or shut down) and a service technician (for example) can flip or change one or more of the switches. Moreover, a customer having a "fixed" system could pay for an upgrade and a service technician could flip or change one or more switches of the configuration module 410 thereby providing upgraded functionality to that customer's computer system.

The configuration module 410 may alternatively be implemented to control the multiplexing module 402 in a dynamic (or on-the-fly) manner. For example, the configuration module 410 may be implemented with one or more registers that can be controlled by software operating on the corresponding computer system. Specifically, the operating system (or some other software) running on the computer system can call a lower level subroutine (e.g., using one or more side-band signals) that may be implemented in firmware that understands how to control the configuration module 410. Furthermore, the software can keep track of the changing resources with respect to the I/O structure (e.g., add-in card slot 428 has the combined communication bandwidth of mid-buses 406 and 408 while add-in card slot 426 has the communication bandwidth of mid-bus 404 as shown in FIG. 5).

Within FIGS. 4 and 5, there are diverse ways for software to dynamically change (or modify or alter) the routing configuration of the multiplexing module 402 via the configuration module 410. For example, provided bus configuration multiplexer system 400 is currently configured as shown in FIG. 4, the first thing that may be done is to put any add-in cards (or interface cards) resident to card slots 426 and 428 into a sleep state or an off-line state so that data is not corrupted or interrupted. Next, software may then transmit one or more signals to address one or more registers of the configuration module 410 to change (or alter or modify) the configuration routing of the multiplexing module 402 (e.g., as shown in FIG. 5). Once the switch is completed, any add-in cards (or interface cards) resident to card slots 426 and 428 may be activated from the sleep state or brought back on-line.

One of the benefits of the bus configuration multiplexer system 400 (FIG. 4) is that it includes functionality that can be engaged if one or more of its components fails such as a bus, an adapter chip, an add-in card slot, and/or an interface card coupled with one of the card slots. For example, if the controller adapter chip 418 of the bus configuration multiplexer system 400 fails or becomes inoperative, manually or by software the configuration module 410 can be directed to cause the configuration routing 502 of the multiplexing module 402 to couple the mid-bus 406 with the mid-bus 416 as shown in FIG. 5. In this fashion, the configuration module 410 is able to reconfigure (or reassign) mid-bus 406 to be coupled with the active adapter chip 420 where its available bandwidth may be utilized instead of not being used while coupled with the inoperative adapter chip 418.

Within another example, if the mid-bus 408 of the bus configuration multiplexer system 400 of FIG. 4 became inoperative (or failed), manually or by software the configuration module 410 can be directed to cause multiplexing module 402 to activate configuration routings 502 (FIG. 5) so that adapter chips 428 and 428 can both remain active. For instance, software (for example) may realize that mid-bus 408 has become inoperative. As such, the software may utilize configuration module 410 and multiplexing module 402 to switch the active mid-bus 406 from being coupled with adapter chip 418 via routing 412 (FIG. 4) to being coupled with adapter chip 420 via routing 502 (FIG. 5). In this manner, the adapter chip 420 can remain active utilizing mid-buses 406 and 416 while the adapter chip 418 can remain active utilizing mid-bus 404. Therefore, any add-in cards (or interface cards) coupled with add-in card slots 426 and 428 can remain active and operational.

Within FIGS. 4 and 5, it is noted that multiplexing module 402 may be modified to be coupled with and handle a greater number of mid-buses similar to mid-bus 406. Additionally, the multiplexing module 402 may be modified to be coupled with a greater number of mid-buses similar to mid-buses 414 and 416. It is understood that each of adapter chips 418 and 420 can each be coupled with greater or fewer mid-buses than those shown in FIGS. 4 and 5.

The controller adapter chips 418 and 420 of FIGS. 4 and 5 can operate and function in a manner similar to the controller adapter chips 122 and 124 of FIGS. 1–3, described herein. However, the controller adapter chips 418 and 420 can constantly remain active (or on-line) since each is coupled with mid-bus 404 or 408, respectively.

With reference to FIGS. 4 and 5, the configuration module 410 and the multiplexing module 402 are well suited to operate with any type (or size) of buses in any manner similar to that described herein with reference to mid-buses. For example, the multiplexing module 402 and configuration module 410 can be implemented to operate with, but not limited to, memory buses, side-band buses, and the like. In this manner, the multiplexing module 402 and configuration module 410 may provide a computer system (or computing device) one or more of the functions and/or benefits described herein with reference to mid-buses. The configuration module 410 and the multiplexing module 402 can be implemented as separate modules as shown or incorporated together as a single module (not shown). The configuration module 410 may be located at a wide variety of locations throughout a computing device. It is noted that the multiplexing module 402 can be implemented in a wide variety of ways. For example, the multiplexing module 402 can be implemented with, but not limited to, electrical circuitry.

Figure 6:
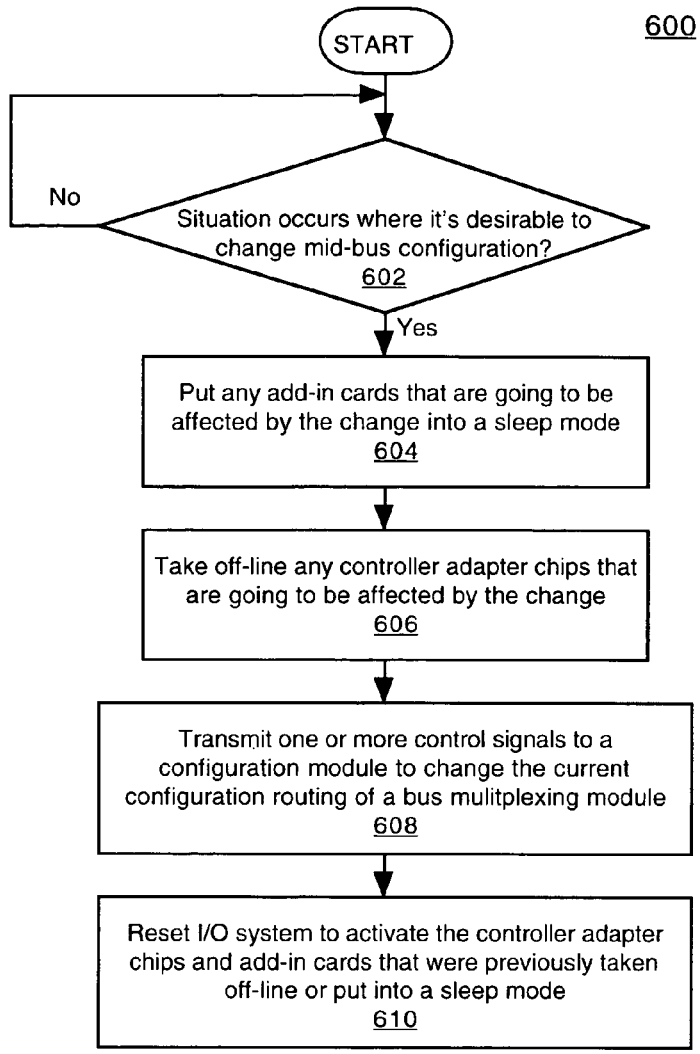
FIG. 6 is a flowchart of operations performed in accordance with an embodiment of the invention for dynamically changing mid-bus configurations for an I/O system (or subsystem) of a computing device.

FIG. 6 is a flowchart 600 of operations performed in accordance with an embodiment of the present invention for dynamically changing mid-bus configurations for an I/O system (or subsystem) of a computing device. Flowchart 600 includes processes which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in flowchart 600, such operations are exemplary. That is, the present embodiment is well suited to performing various other operations or variations of the operations recited in FIG. 6. Within the present embodiment, it should be appreciated that the operations of flowchart 600 may be performed by software, by firmware, by hardware or by any combination thereof.

The present embodiment provides a method for dynamically changing mid-bus configurations in an I/O system (or subsystem) of a computing device. For example, a situation occurs wherein it is desirable to change the current mid-bus configuration. As such, any add-in cards (or interface cards) coupled with any card slots that are going to be affected by the changing of the current mid-bus configuration are put into a sleep mode or taken off-line. Any controller adapter chips that are going to be affected by the changing of the current mid-bus configuration are taken off-line. Next, one or more control signals are transmitted to a configuration module in order to change the current configuration routing of a multiplexing module (or multiplexer module) coupled with one or more mid-buses. Once the configuration routing has been changed, the I/O system (or subsystem) is reset to activate the controller adapter chips and add-in cards that were previously taken off-line (or put into a sleep mode). In this manner, the mid-bus configuration of I/O system (or subsystem) can be dynamically reconfigured.

Figure 8:
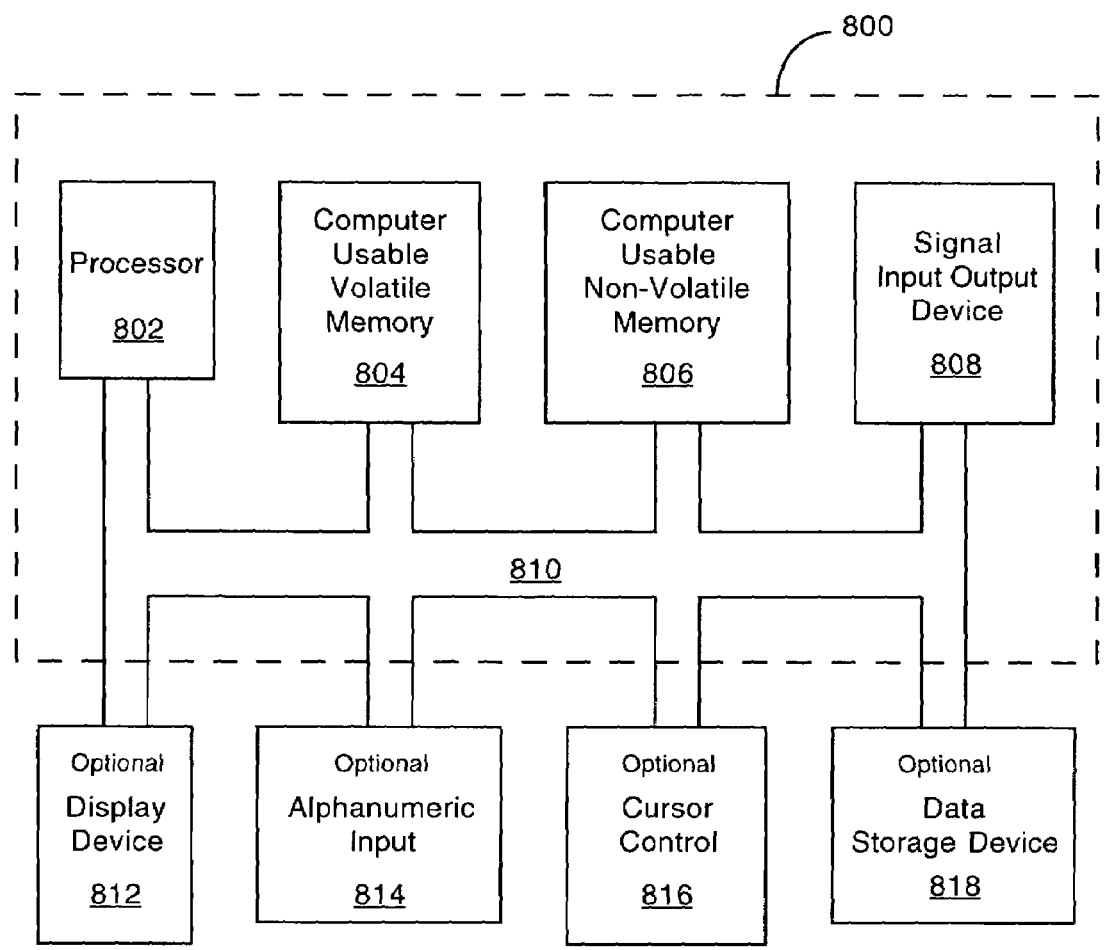
FIG. 8 is a block diagram of an exemplary computer system that may be used in accordance with embodiments of the present invention.

At operation 602 of FIG. 6, a determination is made as to whether a situation has occurred wherein it becomes desirable to change (or modify or alter) the current mid-bus configuration of an I/O system (or subsystem) of a computing device (e.g., 800 of FIG. 8). If it is determined at operation 602 that a situation has not occurred that would warrant changing the current mid-bus configuration, process 600 proceeds to the beginning of operation 602. However, if it is determined at operation 602 that a situation has occurred where it would be desirable to change the current mid-bus configuration, process 600 proceeds to operation 604. It is noted that the determination at operation 602 can be implemented in a wide variety of ways. For example, software operating on the computing device can monitor the operation of components associated with the current mid-bus configuration of the I/O system (or subsystem) at operation 602 in order to determine whether a situation arises where it becomes desirable to modify the current mid-bus configuration. Additionally, the determination at operation 602 may be performed in any manner similar to that described herein, but is not limited to such.

At operation 604, any add-in cards or interface cards coupled with any card slots (e.g., 130, 132, 426 and/or 428) that will be affected by the changing (or modifying) of the current mid-bus configuration are put into a sleep mode or taken off-line so that data associated with those add-in cards are not interrupted and/or corrupted. It is understood that putting any add-in cards into a sleep mode (or taken off-line) at operation 604 can be implemented in diverse ways. For example, software operating on the computing device can initiate the sleep mode (or off-line) process for any of the add-in cards at operation 604. Furthermore, the operation 604 may be performed in any manner similar to that described herein, but is not limited to such.

At operation 606 of FIG. 6, any controller adapter chips (e.g., 122, 124, 418 and/or 420) that will be affected by the changing (or modifying) of the current mid-bus configuration are taken off-line. It is appreciated that taking any controller adapter chips off-line at operation 606 can be implemented in a wide variety of ways. For example, software operating on the computing device can initiate an off-line process for any of the controller adapter chips at operation 606. Moreover, the operation 606 may be performed in any manner similar to that described herein, but is not limited to such.

At operation 608, one or more control signals are transmitted to a configuration module (e.g., 108 or 410) to change or switch or modify or alter the current configuration routing (e.g., 110, 112, 202, 302, 412 and/or 502) of a bus multiplexing module (e.g., 102 or 402) coupled with one or more mid-buses (e.g., 104, 106, 114, 116, 118, 120, 406, 414 and/or 416). It is noted that transmitting one or more control signals to a configuration module at operation 608 can be implemented in diverse ways. For example, at operation 608, software operating on the computing device can transmit to a configuration module one or more control signals (e.g., side-band signals) that cause it to modify the current configuration routing of the bus multiplexing module. Additionally, the operation 608 may be performed in any manner similar to that described herein, but is not limited to such.

At operation 610 of FIG. 6, the I/O system (or subsystem) of the computing device can be reset in order to activate the controller adapter chips (e.g., 122, 124, 418 and/or 420) and add-in cards that were previously taken off-line or put into a sleep mode. It is understood that operation 610 may be performed in any manner similar to that described herein, but is not limited to such. Once operation 610 is completed, process 600 is exited.

Figure 7:
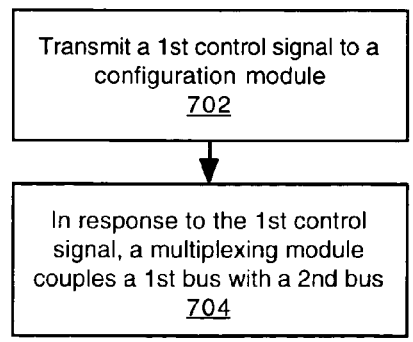
FIG. 7 is a flowchart of operations performed in accordance with an embodiment of the present invention for changing a bus configuration of a computing device.

FIG. 7 is a flowchart 700 of operations performed in accordance with an embodiment of the present invention for changing a bus configuration of a computing device. Flowchart 700 includes processes which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in flowchart 700, such operations are exemplary. That is, the present embodiment is well suited to performing various other operations or variations of the operations recited in FIG. 7. Within the present embodiment, it should be appreciated that the operations of flowchart 700 may be performed by software, by firmware, by hardware or by any combination thereof.

The present embodiment provides a method for changing a bus configuration of a computing device (or computer system). For example, a first control signal can be transmitted (or sent) to a configuration module. In response to the first control signal, a multiplexing module (or multiplexer module) can be caused to couple a first bus with a second bus of the computing device. In this manner, the present embodiment is able to change the bus configuration of the computing device (or computer system).

At operation 702 of FIG. 7, a first control signal can be transmitted (or sent) to a configuration module (e.g., 108 or 410). It is understood that operation 702 can be implemented in a wide variety of ways. For example, operation 702 can be implemented in any manner similar to that described herein, but is not limited to such.

At operation 704, in response to the first control signal, a multiplexing module (e.g., 102 or 402) can be caused to couple a first bus (e.g., 104, 106 or 406) with a second bus (e.g., 114, 116, 118, 120, 414 or 416) of the computing device (e.g., 800 of FIG. 8). It is appreciated that operation 704 can be implemented in diverse ways. For example, operation 704 can be implemented in any manner similar to that described herein, but is not limited to such.

It is noted that additional operations may also be included as part of process 700. For example, a second control signal can be transmitted (or sent) to the configuration module. Additionally, in response to the second control signal, the multiplexing module can be caused to couple the first bus with a third bus. Another operation may include a controller adapter chip that is coupled with the second bus can be caused to go off-line (or be shutdown). Moreover, an add-in card can enter a sleep mode, wherein the add-in card is coupled with an add-in card slot that is coupled with the controller adapter chip. Another operation may include the controller adapter chip and the add-in card being activated once the first bus is coupled with the second bus. Yet another operation may include an add-in card entering a sleep mode, wherein the add-in card can be coupled with an add-in card slot which can be coupled with the second bus. It is further noted that any number of operations (or functions) described herein can be included as part of process 700, but it is not limited to such.

FIG. 8 is a block diagram of an exemplary computer system 800 that may be used in accordance with embodiments of the present invention. It is understood that system 800 is not strictly limited to be a computer system. As such, system 800 of the present embodiment is well suited to be any type of computing device (e.g., server computer, desktop computer, laptop computer, portable computing device, database computer, etc.). Within the discussions of embodiments in accordance with the present invention herein, certain processes and operations were discussed that may be realized, in some embodiments, as a series of instructions (e.g., software program) that reside within computer readable memory of computer system 800 and executed by a processor(s) of system 800. When executed, the instructions can cause computer 800 to perform specific operations and exhibit specific behavior which are described herein.

It is noted that depending on the actual computer architecture utilized for system 800, one or more multiplexing modules (e.g., 102 and/or 402) and configuration modules (e.g., 108 and/or 410) can be implemented as part of one or more communication interfaces 808 and/or one or more mass data storage devices 818. Furthermore, one or more multiplexing modules (e.g., 102 and/or 402) and configuration modules (e.g., 108 and/or 410) can be implemented as part of a bus structure 810 which controls bus bandwidth to communication interface(s) 808 and/or mass data storage device(s) 818.

Computer system 800 comprises an address/data bus 810 for communicating information, one or more central processors 802 coupled with bus 810 for processing information and instructions. Central processor unit(s) 802 may be a microprocessor or any other type of processor. The computer 800 also includes data storage features such as computer usable volatile memory 804, e.g., random access memory (RAM), static RAM, dynamic RAM, etc., coupled with bus 810 for storing information and instructions for central processor(s) 802, computer usable non-volatile memory 806, e.g., read only memory (ROM), programmable ROM, flash memory, erasable programmable read only memory (EPROM), electrically erasable programmable read only memory (EEPROM), etc., coupled with bus 810 for storing static information and instructions for processor(s) 802.

System 800 of FIG. 8 also includes, one or more signal generating and receiving devices 808 coupled with bus 810 for enabling system 800 to interface with other electronic devices. The communication interface(s) 808 of the present embodiment may include wired and/or wireless communication technology. For example, in one embodiment of the present invention, the communication interface 808 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case the communication interface(s) 808 may include a cable modem or a DSL modem.

Optionally, computer system 800 can include an alphanumeric input device 814 including alphanumeric and function keys coupled to the bus 810 for communicating information and command selections to the central processor(s) 802. The computer 800 can also include an optional cursor control or cursor directing device 816 coupled to the bus 810 for communicating user input information and command selections to the processor(s) 802. The cursor directing device 816 can be implemented using a number of well known devices such as a mouse, a track ball, a track pad, an optical tracking device, a touch screen, etc. Alternatively, it is appreciated that a cursor can be directed and/or activated via input from the alphanumeric input device 814 using special keys and key sequence commands. The present embodiment is also well suited to directing a cursor by other means such as, for example, voice commands.

The system 800 of FIG. 8 can also include a computer usable mass data storage device 818 such as a magnetic or optical disk and disk drive (e.g., hard drive or floppy diskette) coupled with bus 810 for storing information and instructions. An optional display device 812 is coupled to bus 810 of system 800 for displaying video and/or graphics.

It should be appreciated that optional display device 812 may be a cathode ray tube (CRT), flat panel liquid crystal display (LCD), field emission display (FED), plasma display or any other display device suitable for displaying video and/or graphic images and alphanumeric characters recognizable to a user.

It is noted that the components associated with system 800 described above may be resident to and associated with one physical computing device. However, one or more of the components associated with system 800 may be physically distributed to other locations and be communicatively coupled together (e.g., via a network).

The foregoing descriptions of specific embodiments of the present invention have been presented for purposes of illustration and description. They are not intended to be exhaustive or to limit the invention to the precise forms disclosed, and it is evident many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for changing a bus configuration of a computing device, said system comprising:
   a first bus of said computing device;
   a second bus of said computing device;
   a third bus coupled with a first device;
   a fourth bus coupled with said first device;
   a fifth bus coupled with a second device;
   a sixth bus coupled with said second device;
   a multiplexing module coupled with said first bus, said second bus, said third bus, said fourth bus, said fifth bus, and said sixth bus, and for selectively coupling said first and second busses with said third, fourth, fifth, or sixth busses; and
   a configuration module coupled with said multiplexing module and for controlling operation of said multiplexing module.

2. The system of claim 1 wherein said first device comprises a first controller adapter chip and said second device comprises a second controller adapter chip.

3. The system of claim 2, further comprising:
   a first add-in card slot coupled with said first controller adapter chip; and
   a second add-in card slot coupled with said second controller adapter chip.

4. The system of claim 1, wherein said first device comprises a first add-in card slot and said second device comprises a second add-in card slot.

5. The system of claim 1, wherein said multiplexing module comprises electrical circuitry.

6. The system of claim 1, wherein said multiplexing module comprises:
   a first configuration routing for coupling said first bus with said third bus;
   a second configuration routing for coupling said first bus with said fourth bus;
   a third configuration routing for coupling said first bus with said fifth bus;
   a fourth configuration routing for coupling said first bus with said sixth bus;

a fifth configuration routing for coupling said second bus with said third bus;

a sixth configuration routing for coupling said second bus with said fourth bus;

a seventh configuration routing for coupling said second bus with said fifth bus; and an eighth configuration routing for coupling said second bus with said sixth bus.

7. The system of claim 1, wherein said configuration module comprises a register.

8. The system of claim 1, wherein said configuration module comprises a switch.

9. A method for changing a bus configuration of a computing device, said method comprising:

transmitting a first control signal to a configuration module;

causing a multiplexing module, to couple a first bus with a second bus of said computing device, in response to said first control signal, said second bus coupled with a first device;

transmitting a second control signal to said configuration module, and causing said multiplexing module to couple a third bus with a fourth bus of said computing device, in response to said second control signal, said fourth bus coupled with said first device.

10. The method as described in claim 9, further comprising:

transmitting a third control signal to said configuration module; and causing said multiplexing module to couple said first bus with a fifth bus in response to said third control signal, said fifth bus coupled with a second device.

11. The method as described in claim 9, further comprising: causing a controller adapter chip coupled with said second bus to go off-line.

12. The method as described in claim 11, further comprising:

causing an add-in card to enter a sleep mode, said add-in card coupled with an add-in card slot which is coupled with said controller adapter chip.

13. The method as described in claim 12, further comprising:

activating said controller adapter chip and said add-in card once said first bus is coupled with said second bus.

14. The method as described in claim 9, further comprising:

causing an add-in card to enter a sleep mode, said add-in card coupled with an add-in card slot which is coupled with said second bus.

15. A system for modifying an input/output (I/O) bus configuration of a computer system, said system comprising:

a first I/O bus of said computer system;

a second I/O bus;

a third I/O bus coupled with a first device;

a fourth I/O bus coupled with said first device;

a fifth I/O bus coupled with a second device;

a sixth I/O bus coupled with said second device;

a multiplexer circuitry coupled with said first I/O bus, said second I/O bus, said third I/O bus, said fourth I/O bus, said fifth I/O bus, and said sixth I/O bus, and for selectively coupling said first and second I/O busses with said third, fourth, fifth, or sixth I/O busses; and a configuration module coupled with said multiplexer circuitry and for controlling operation of said multiplexer circuitry.

16. The system of claim 15 wherein said first device comprises a first controller adapter chip and said second device comprises a second controller adapter chip.

17. The system of claim 16, further comprising:

a first add-in card slot coupled with said first controller adapter chip; and a second add-in card slot coupled with said second controller adapter chip.

18. The system of claim 15 wherein said first device comprises a first add-in card slot and said second device comprises a second add-in card slot.

19. The system of claim 15, wherein said multiplexer circuitry comprises:

a first configuration routing for coupling said first I/O bus with said third I/O bus;

a second configuration routing for coupling said first I/O bus with said fourth I/O bus;

a third configuration routing for coupling said first I/O bus with said fifth I/O bus;

a fourth configuration routing for coupling said first I/O bus with said sixth I/O bus;

a fifth configuration routing for coupling said second I/O bus with said third I/O bus;

a sixth configuration routing for coupling said second I/O bus with said fourth I/O bus;

a seventh configuration routing for coupling said second I/O bus with said fifth I/O bus; and an eighth configuration routing for coupling said second I/O bus with said sixth I/O bus;.

20. The system of claim 15, wherein said configuration module comprises a register.

21. The system of claim 15, wherein said configuration module comprises a hardware switch.

* * * * *

UNITED STATES PATENT AND TRADEMARK OFFICE
CERTIFICATE OF CORRECTION

PATENT NO. : 7,136,957 B2 Page 1 of 1
APPLICATION NO. : 10/808881
DATED : November 14, 2006
INVENTOR(S) : Kevin M. Somervill et al.

It is certified that error appears in the above-identified patent and that said Letters Patent is hereby corrected as shown below:

In column 15, line 17, in Claim 9, delete "module," and insert -- module --, therefor.

In column 16, line 46, in Claim 19, delete "bus;." and insert -- bus. --, therefor.

Signed and Sealed this

Twenty-second Day of June, 2010

David J. Kappos
*Director of the United States Patent and Trademark Office*